United States Patent [19]

Klinger

[11] 4,139,811

[45] Feb. 13, 1979

[54] METHOD AND MEANS FOR INCREASING THE STIFFNESS OF LIMITED FREQUENCY SERVO SYSTEMS

[75] Inventor: Lance T. Klinger, Playa Del Rey, Calif.

[73] Assignee: Xerox Corporation, Stamford, Conn.

[21] Appl. No.: 735,716

[22] Filed: Oct. 26, 1976

[51] Int. Cl.² ............................................. G05B 5/01
[52] U.S. Cl. ..................................... 318/615; 318/611
[58] Field of Search ................................ 318/615, 611

[56] References Cited

U.S. PATENT DOCUMENTS 3,012,180  12/1961  Finvold ............................... 318/611
3,283,230  11/1966  Davies et al. ........................ 318/611

Primary Examiner—Robert K. Schaefer
Assistant Examiner—Eugene S. Indyk
Attorney, Agent, or Firm—Barry Paul Smith

[57] ABSTRACT

The stiffness of a second-order damped servo system with position and velocity feedback circuits is increased without affecting the command response, damping factor, or natural frequency of the system by adding an acceleration feedback circuit and maintaining a specified relationship between the effective gain of the acceleration feedback circuit and the effective gain of the servo driver.

3 Claims, 3 Drawing Figures

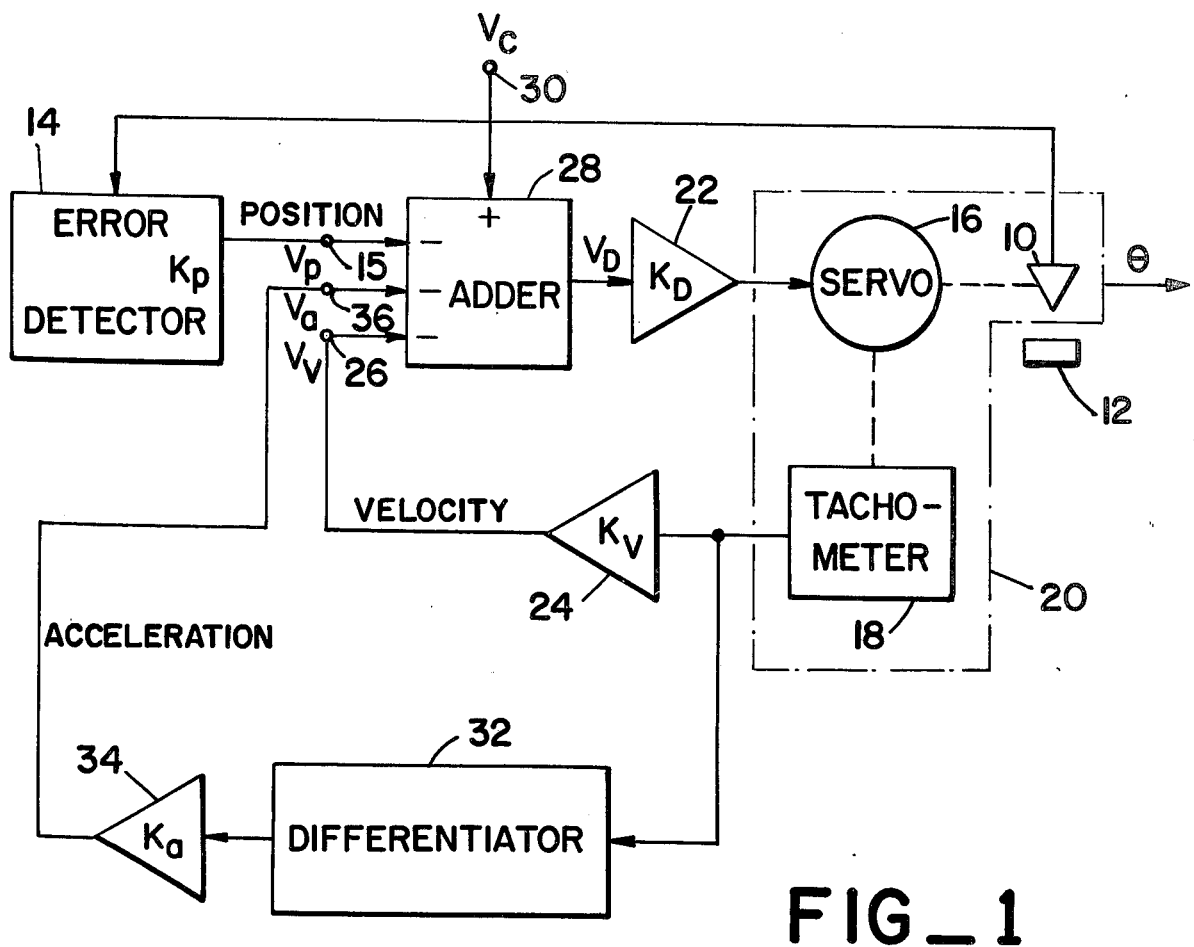
FIG_1
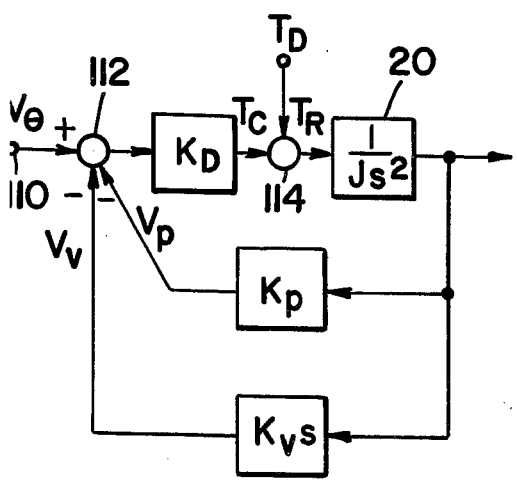
FIG_2
(PRIOR ART)
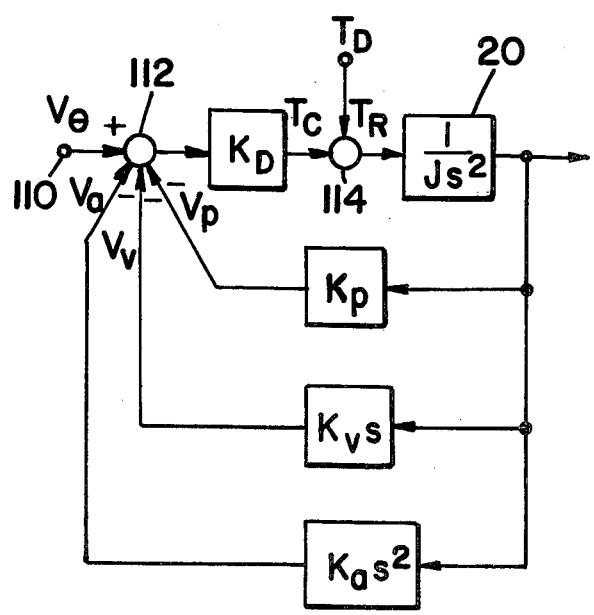
FIG_3

METHOD AND MEANS FOR INCREASING THE STIFFNESS OF LIMITED FREQUENCY SERVO SYSTEMS

BACKGROUND OF THE INVENTION

Magnetic disc drives require the read/write head to track very accurately a very narrow data track on the disc while the disc surface passes under the head at very high speed. The head is kept centered on the track by a closed-loop servo system in which deviations of the head from the track center are detected by an off-track error detector (e.g. the detector disclosed in my copending application Ser. No. 735,851, filed Oct. 26, 1976, and entitled *METHOD AND MEANS FOR CAPTURING MAGNETIC TRACKS*, whose output is used as a position feedback to move the head back toward the track center). Stability of the head about the track center is achieved by detecting the velocity of the head motion by means of a tachometer and using the velocity indication as a damping velocity feedback. The resulting system is mathematically a damped second-order system.

Under the stringent operating conditions of a practical device, the head is constantly subjected to disturbance forces such as windage, vibration, or friction. The degree to which the head servo system is immune to such disturbance forces is known as the "stiffness factor" of the system, wherein the term "stiffness factor" has been defined generally as the angular lag between the input and output of a servo system. In the context of the present invention, the stiffness factor decreases as the immunity to the above-mentioned disturbance forces increases. In a conventional damped second-order servo system, the stiffness factor thereof is determined by such factors as the bandwidth, inertia (or mass) and damping of the system.

The natural frequency of a practical disc drive position servo must be limited to avoid excitation of mechanical resonances. Where economic factors dictate the use of a low-power actuator, the rotational inertia of the mechanism is limited to a rather low value. The use of such a very low inertia rotational position assembly, in conjunction with the limited bandwidth inherently allowable in mechanical systems, increases the stiffness factor in an appropriately damped stable second order system, to an intolerable degree.

Prior art disc drives did not have a stiffness factor limitation problem because they used linear positioners with inherently high mass requiring very high power inputs. Having paid the price of a high power position actuator, a suitable stiffness factor was usually allowed by the mass of the actuator and load. In addition, the prior art in some instances used two special techniques which should not be confused with this invention because they do not achieve the same result. In the first of these, the time integral of position error was fed back into the system. This results in a third order system with a decreased stiffness factor at low frequencies; however, the desired stiffness factor cannot be provided up to the natural frequency of the second order system, due to stability requirements. The second prior art technique used current feedback from the position actuator, which is related to acceleration. This technique can reduce the effect of the actuator time constant, but does not achieve a decreased stiffness factor.

SUMMARY OF THE INVENTION

The present invention makes possible the use of low inertia rotational positioning mechanisms in second-order damped electromechanical systems such as disc drive head positioning systems with a sufficiently low stiffness factor by electronically simulating additional inertia in the system. This is accomplished by adding to the position and velocity feedbacks of the conventional damped system an acceleration feedback. If a specific mathematical relationship is maintained between the gain of the acceleration feedback circuit and the other system parameters, the stiffness factor can be decreased manyfold without affecting the damping factor or increasing the natural frequency of the system. The invention, as a practical matter, enables the desired position accuracy to be achieved with significant cost reduction.

It is therefore the primary object of the invention to provide a method and means for decreasing the stiffness factor of a second-order damped servo system with very low rotational inertia without significantly affecting its response to command signals, its damping factor, or its natural frequency.

It is another object of the invention to accomplish the foregoing objective by providing an acceleration feedback loop in addition to the position and velocity feedback loops normally provided in second-order damped servo systems.

It is a further object of the invention to specify the relationship between a gain increase of the actuator driver and the gain of the acceleration feedback circuit which will produce a selectable, multifold decrease in stiffness factor without any effect on command response, damping, or natural frequency for any given mechanical subsystem of an electromechanical servo system.

BRIEF DESCRIPTION OF THE DRAWINGS

FIG. 1 is a schematic representation showing, in block diagram form, the components of a servo system constructed in accordance with the invention;

FIG. 2 is a schematic representation illustrating the electromechanical relationships in a most basic conventional second-order damped system; and FIG. 3 is a schematic representation illustrating the electromechanical relationship in a most basic second-order damped system with acceleration feedback in accordance with the invention.

DESCRIPTION OF THE PREFERRED EMBODIMENT

FIG. 1 shows, in block form, those portions of a magnetic disc drive unit constructed in accordance with this invention which are relevant to the functioning of the invention. A head 10 is positionable over any one of a large number of magnetic tracks recorded on the disc 12. As explained in detail in my copending application Ser. No. 735,851, filed Oct. 26, 1976, and entitled METHOD AND MEANS FOR CAPTURING MAGNETIC TRACKS, the disc carries certain magnetic position indicia which, then picked up by the head 10 and transmitted to the error detector 14, cause the error detector to supply to adder input 15 an algebraic position voltage $V_p$ whose magnitude is proportional to the displacement of the head from the center of the track which the head 10 is currently following, and whose sign indicates the direction of that displacement from the track center. The functioning of one appropriate type of error detector 14 is explained in detail in my aforesaid copending application.

The head 10, actuator 16, and tachometer 18 together form a mechanical subsystem 20 which has known physical dimensions mass and hence a known rotational inertia. The electrical output of actuator driver 22 is translated by the actuator 16 (which is a circular voice coil actuator with no preferred position) into a physical torque acting on the subsystem 20. In addition to this intentional or commanded torque, the subsystem 20 is subjected to disturbance torques from a variety of sources such as windage, friction, and vibration. The combined application of all of these torques results in a physical displacement of the head from the track center. (The angle symbol $\theta$ of the head from the track center. The angle symbol $\theta$ is being used in this description because the invention is particularly useful in disc drives in which the head is mounted on a pivoting arm, similar in shape to the tone arm of a record player, for movement across the disc.)

The tachometer 18 produces an electrical output whose magnitude is proportional to the angular velocity of the actuator 16, and whose sign is indicative of the actuator's direction of rotation. The velocity signal is amplified in velocity amplifier 24 to produce an algebraic velocity voltaage $V_y$ at adder input 26. The voltages $V_p$ and $V_y$ at inputs 15, 26 constitute the position and velocity feedbacks of the servo system of FIG. 1. They are negatively added together by the adder 28 whose output is the correction voltage $V_D$ applied to the servo driver 22.

The positive input 30 of adder 28 is shown as having a compound voltage $V_c$ applied thereto. In actuality, the command voltage $V_c$ is present only when it is desired to move the head 10 to another track. In that case, a command voltage $V_c$ of appropriate sign and magnitude is used to impart to the system 20 a sufficient displacement $\theta$ to cause the system to capture another desired track, as explained in my copending applications Ser. No. 735,717, now Pat. No. 4,099,112 filed Oct. 26, 1976, and entitled *METHOD AND MEANS FOR SEEKING MAGNETIC TRACKS*, and Ser. No. 735,852, filed Oct. 26, 1976, and entitled *METHOD AND MEANS FOR TRACKING MAGNETIC TRACKS*. However, for the purposes of the present invention, we are concerned only with the capture-and-track mode of the servo system, i.e. the mode in which it maintains the head 10 centered on a specific selected track. In that mode, $V_c$ is zero and can therefore be ignored.

So far, the described system is conventional. In accordance with the invention, however, an acceleration feedback loop is added in the system of FIG. 1 to electrically decrease the stiffness factor (i.e. resistance to disturbance torque) of the physical system 20. The acceleration feedback loop consists of differentiator 32 and acceleration amplifier 34. The velocity signal produced by the tachometer 18 is differentiated in differentiator 32 to provide an acceleration signal which is amplified by the acceleration amplifier 34 to produce an algebraic acceleration voltage $V_a$ at negative adder input 36. The magnitude of $V_a$ is proportional to the net acceleration or deceleration torque to which the system 20 is subjected, and the sign of $V_a$ is indicative of the direction in which that torque is applied to the system 20.

The error detector 14, servo driver 22, velocity amplifier 24, and acceleration amplifier 34 each have an adjustable gain denoted, respectively, as $K_p$, $K_D$, $K_v$, and $K_a$. $K_p$, in the following discussion, denotes the effective gain of the position feedback circuit, i.e. the ratio of the position feedback voltage $V_p$ to the displacement of head 10 in volts per radian; $K_D$, the effective gain of the servo driver, i.e. the ratio of the command torque applied to subsystem 20 to the adder output $V_D$ in ounce-inch second$^2$ per volt; $K_v$, the ratio of the velocity feedback voltage $V_y$ to the displacement velocity of head 10 in volts per radian per second; and $K_a$, the effective gain of the acceleration feedback circuit, i.e. the ratio of the acceleration feedback voltage $V_a$ to the acceleration of head 10 in volts per radian per second$^2$.

The manner in which the system in FIG. 1 achieves a large decrease in stiffness factor without affecting its command response, damping factor, or natural frequency can best be explained by the following comparison of a conventional second-order damping system (FIG. 2) and a second-order damping system with acceleration feedback in accordance with the invention (FIG. 3).

In FIG. 2, 110 designates a commanded angle input $V_\theta$ expressed in terms of voltage. As pointed out above, $V_\theta = 0$ in the environment of FIG. 1, as the system of FIG. 1 is designed to track the data track in the center position where the output of the error detector 14 is zero.

Junction 112 of the schematic representation of FIG. 2 algebraically combines the positive commanded angle voltage $V_\theta$ with the negative position and velocity feedback voltages $V_p$ and $V_y$. The resultant voltage is amplified by a factor $K_D$ which the servo driver 22 (FIG. 1) translates into a correction torque $T_C$. Junction 144 schematically represents the algebraic combination of the correction torque $T_C$ with the disturbance torque $T_D$ such as windage or vibration. The combined torque $T_R$ acts on the subsystem 20 of FIG. 1, represented in FIG. 2 by the mathematical notation $1/Js^2$ denoting a physical second-order system. The application of the combined torque $T_R$ to the physical system $1/Js^2$ results in the actual displacement, by an angle $\theta$, of the subsystem 20. In this discussion, J is the actual inertia of the subsystem 20, and s is an operator involved in the calculation of the transfer function representing frequency or time response to a command, and of the disturbance sensitivity function representing frequency or time response to a disturbance torque. For frequency response calculations, $s = jw$; for time response calculations, s is the Laplace operator.

In the conventional damped system of FIG. 2, a position feedback having an overall gain of $K_p$ and a velocity feedback having an effective gain of $K_v$ are derived from the movement of the physical subsystem 20. With these parameters, it can be shown by mathematical derivations familiar to those skilled in the servo art that the relationships shown by equations (1) through (7) of Table I prevail.

In FIG. 3, an acceleration feedback having an effective gain of $K_a s^2$ is added to the system of FIG. 2 to provide a negative acceleration feedback voltage $V_a$ which is combined with $V_\theta$, $V_p$ and $V_y$ at junction 122. With this additional feedback loop, the relationships of equations (1) through (7) of Table I become those shown by equations (8) through (14) of Table I.

It will be noted that in both systems, the stiffness factor can be decreased by increasing either $K_D$ to push the head off-center by a given amount, can be increased by increasing either $K_D$ or $K_p$, or both. However, in the conventional damped system of FIG. 2, this would result in an increase in the natural frequency of the system. This is undesirable in practice because of the risk of exciting mechanical resonances. Likewise, unless the increase in $K_D$ is matched by a proportionate increase in $K_p$, the damping factor which, for optimum operation, must remain just below unity, is adversely affected. The frequency or time response of the system to both commands and disturbances are also affected by an increase in $K_D$ and/or $K_p$.

In the system of FIG. 3, however, position stiffness can be decreased without increasing its mass. In terms of the reaction of the subsystem 20 to an external disturbance, this increase in apparent inertia is very real: if one attempts to push the head 10 off-center by hand in a device constructed in accordance with this invention, it resists the force "X" times more than without the acceleration loop. Consequently, the invention allows the use of inexpensive, lightweight position actuator mechanisms without imposing an increased stiffness factor limitation for limited frequency applications.

| PARAMETER | CONVENTIONAL DAMPED SYSTEM | | SECOND ORDER SYSTEM ($K_D = XKD_o$) WITH ACCELERATION FEEDBACK ($K_a = (J/K_{D_o})(X-1)/X$) | |
|---|---|---|---|---|
| Frequency or time response to AC or sudden command | $\dfrac{\theta(s)}{\theta_c(s)} = \dfrac{1}{\left(\dfrac{J}{K_{D_o}}\right)s^2 + (K_v)s + K_p}$ | (1) | $\dfrac{\theta(s)}{\theta_c(s)} = \dfrac{1}{\left(\dfrac{J + K_a K_D}{K_D}\right)s^2 + (K_v)s + K_p}$ | (8) |
| Frequency or time response to AC or sudden disturbance. | $\dfrac{\theta(s)}{T_D(s)} = \dfrac{\dfrac{1}{K_D}}{\left(\dfrac{J}{K_{D_o}}\right)s^2 + (K_v)s + K_p}$ | (2) | $\dfrac{\theta(s)}{T_D(s)} = \dfrac{\dfrac{1}{K_D}}{\left(\dfrac{J + K_a K_D}{K_D}\right)s^2 + (K_v)s + K_p}$ | (9) |
| Damping factor | $\delta = \left[\left(\dfrac{K_{D_o}}{J}\right)\dfrac{K_v^2}{4K_p}\right]^{\frac{1}{2}}$ | (3) | $\delta = \left[\left(\dfrac{K_D}{J + K_a K_D}\right)\dfrac{K_v^2}{4K_p}\right]^{\frac{1}{2}}$ | (10) |
| Natural frequency | $W_n = \left[\left(\dfrac{K_{D_o}}{J}\right)K_p\right]^{\frac{1}{2}}$ | (4) | $W_n = \left[\left(\dfrac{K_D}{J + K_a K_D}\right)K_p\right]^{\frac{1}{2}}$ | (11) |
| Position stiffness | $G_p = K_{D_o}K_p$ | (5) | $G_p = K_D K_p$ | (12) |
| Velocity stiffness | $G_v = K_{D_o}K_v$ | (6) | $G_v = K_D K_p$ | (13) |
| Acceleration stiffness | $G_a = J$ | (7) | $G_a = J + K_a K_D$ | (14) | can be decreased by any desired amount X, within reason, without affecting command response, damping or natural frequency, merely by increasing $K_D$ by a factor of X to become $$K_D = XK_{D_o}$$

and setting $K_a$ to be $$K_a = \left(\dfrac{J}{K_{D_o}}\right)\left(\dfrac{X-1}{X}\right)$$

in which $K_{D_o}$ is the value of $K_D$ which would be used in a conventional damped system having the same actual inertia. It will be seen that with this value of $K_a$, and an X-fold increase in $K_D$, the factor $$\dfrac{J + K_a K_D}{K_D}$$

remains unchanged in equations (8) through (11) as compared to equations (1) through (4), in spite of the X-fold increase in $K_D$. Consequently, in the inventive system, with an X-fold increase in $K_D$ over the conventional system, and an acceleration feedback loop with the appropriate setting of $K_a$ identified above, the following effects will be noted:

Frequency/time response to commands: No change
Frequency/time response to disturbances:
  Changed by a factor of 1/X
Damping factor: No change
Natural frequency: No change
Stiffness factor: X-fold decrease Thus, in the system of the invention, the stiffness factor is decrease X-fold, while at the same time reducing the responsiveness of the system to high-frequency disturbances up to the system's natural frequency $w_n$.

In essence, the system of this invention allows the apparent inertia of the physical subsystem 20 to be increased without increasing its mass.

What is claimed is:

1. In a damped second-order electromechanical servo system including a physical subsystem having a predetermined inertia, said subsystem being maintained in a commanded position by a command torque governed by signals applied to a driving means, and displaced from that position by a disturbance torque, said servo system including position and displacement velocity feedback means which produce position and velocity feedback signals which are applied to said driving means, the improvement comprising:

(a) acceleration feedback means arranged to produce an acceleration feedback signal for application to said driving means, said acceleration feedback signal being proportional to the acceleration component of the displacement movement of said subsystem; and the effective gain of said acceleration feedback means being $$K_a = \dfrac{J}{K_{Do}} \cdot \dfrac{X-1}{X}$$

where J is the inertia of said physical subsystem; $K_D$ is the effective gain of said driving means; $K_{Do}$ is the value of $K_D$ at which said servo system has desired values of damping and natural frequency in the absence of said acceleration feedback means; and X is the factor by which $K_D$ must be increased over $K_{Do}$ in order to obtain a desired stiffness factor of said servo system without changing the effective response time of said position feedback means, whereby said stiffness factor is decreased by a factor of X without changing the damping factor or natural frequency of said servo system; and (b) means for applying said acceleration feedback signal to said driving means.

2. The improvement of claim 1, in which said position, velocity, and acceleration feedback signals are additively combined to form a total negative feedback input to said driving means.

3. The method of decreasing the stiffness factor, without affecting the damping factor or natural frequency, of an electromechanical servo system including a physical subsystem having a predetermined inertia, said subsystem being driven by a driving means to whose input the output of a position feedback means and of a velocity feedback means are applied, comprising the steps of:

(a) providing acceleration feedback means having an output representative of the acceleration of said physical subsystem, the gain of said acceleration feedback means being $$K_a = \frac{J}{K_{D_0}} \frac{X-1}{X}$$

where J is the inertia of said physical subsystem, $K_D$ is the effective gain of said driving means, $K_{D_0}$ is the value of $K_D$ which produces desired values of damping and natural frequency of the servo system in the absence of said acceleration feedback signal, and X is the numerical factor by which $K_D$ must be increased over $K_{D_0}$ to obtain a desired amount of stiffness factor without changing the gain of said position feedback means, and (b) applying said acceleration feedback output to the input of said driving means.

* * * * *